Figure 1:
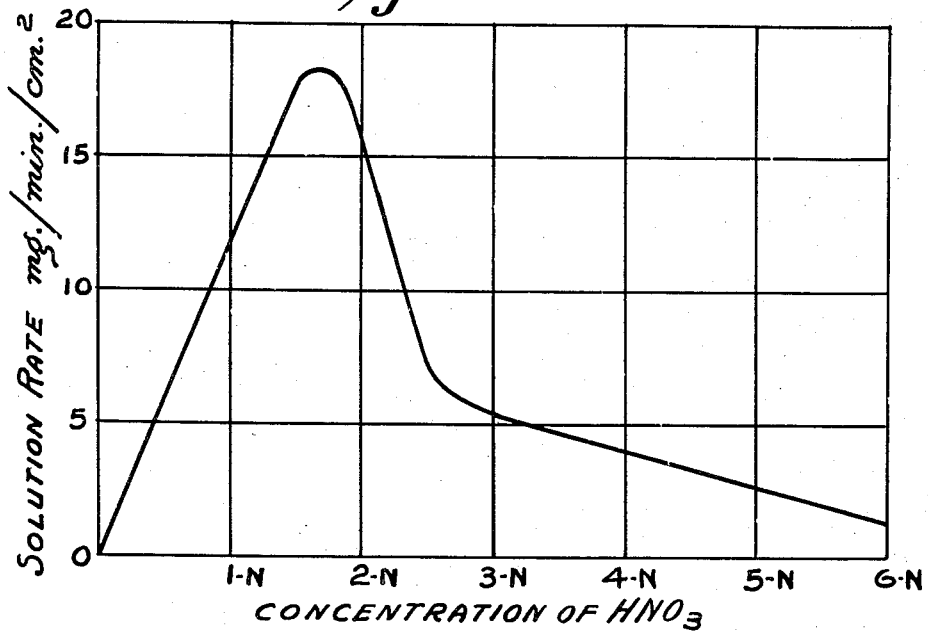

INVENTOR.
RAFAEL LANDRON JR.
BY
ATTORNEY

Sept. 16, 1958     R. LANDRON, JR     2,852,352
METHOD OF REMOVING LEAD BORATE SEALING GLASSES
Filed May 29, 1956     2 Sheets-Sheet 2
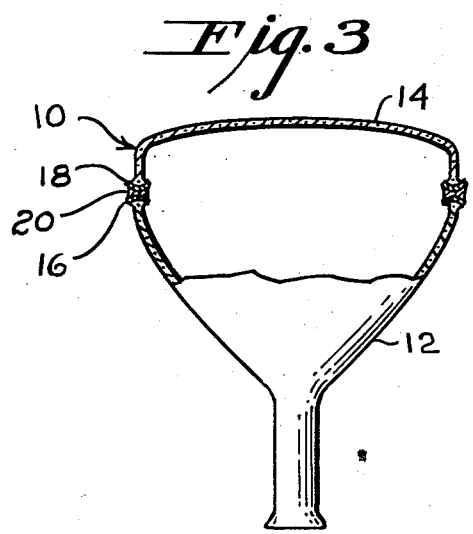
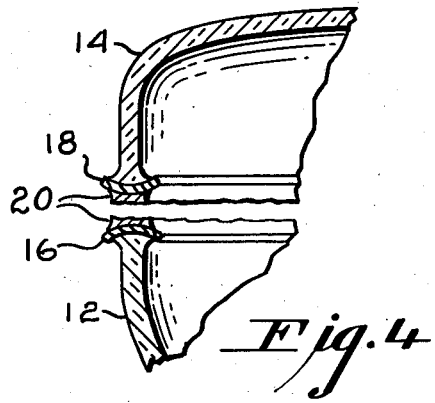
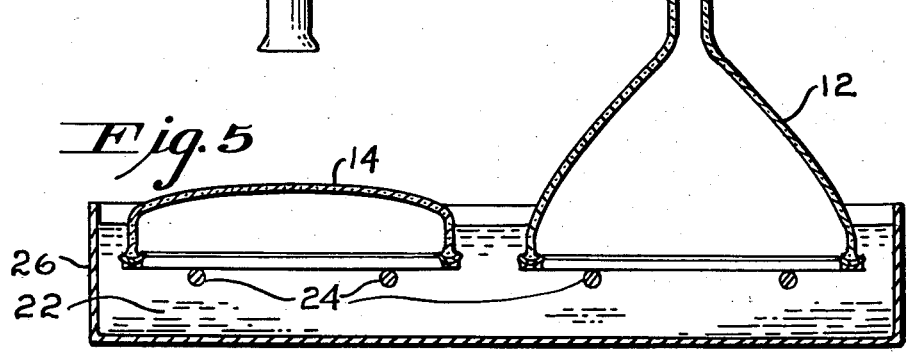
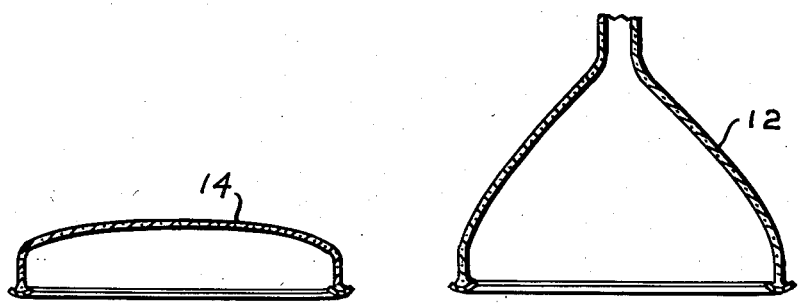
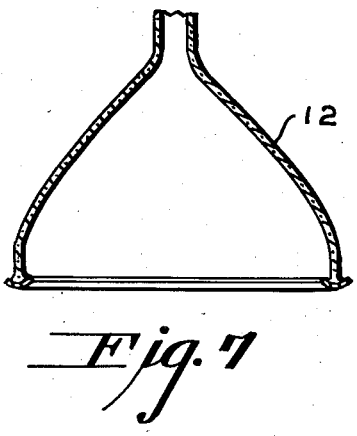
INVENTOR.
RAFAEL LANDRON Jr.
BY
ATTORNEY

United States Patent Office 2,852,352
Patented Sept. 16, 1958

2,852,352
METHOD OF REMOVING LEAD BORATE SEALING GLASSES

Rafael Landron, Jr., Corning, N. Y., assignor to Corning Glass Works, Corning, N. Y., a corporation of New York Application May 29, 1956, Serial No. 588,058

11 Claims. (Cl. 41—42)

This invention relates to the chemical removal of lead borate glasses from sealing surfaces. It is particularly concerned with the removal of such glasses from envelope components in the salvage of defective cathode ray tubes.

Large cathode ray tube envelopes, particularly those designed for television receiving sets, are composed of funnel and panel, or face plate, members molded separately and united by a subsequent sealing operation. The sealing operation customarily involves effecting a direct fusion weld or seal between the members by thermally softening the sealing surface of at least one of the members to be united. While this direct fusion sealing process has proven quite satisfactory in regular tube production, numerous difficulties arise when it is applied to production of tubes for color television receivers. The intense heat required to soften the sealing surfaces, as well as the flame or other heating means itself, tends to impair or totally destroy sensitive phosphors, electron filters and the like which must be incorporated in the tubes prior to sealing.

As a result, it would be desirable to utilize alternative sealing processes wherein the sealing surfaces of the funnel and panel members are united with an intermediate soft sealing glass. Such a sealing process is described in Dalton Patent No. 2,642,633 which also discloses soft, lead borate type, sealing glasses suitable for use in the method. In co-pending application S. N. 562,763, filed February 1, 1956 in the name of Stewart A. Claypoole and assigned to the same assignee as the present application, a modified sealing method is disclosed wherein a seal is formed with an intermediate soft sealing glass and the sealing glass is subsequently hardened by devitrification. The term soft sealing glass denotes a glass having expansion and other sealing properties compatible with two bodies of glass or other material to be joined, but having a softening temperature considerably lower than that of the glass being sealed whereby the sealing glass can be softened and a seal formed without distorting the bodies being joined together.

One of the controlling criteria in evaluating any sealing process is the feasibility of salvaging defective tubes incorporating envelopes sealed by the process. It is generally accepted that at least a small percentage of tube production will be defective due to misalignment of parts, improper application of screen coatings, imperfect seals and the like. Considerable savings can be effected then by an effective and inexpensive salvage method. The matter of salvage is particularly important in production of tubes for reception of color television, since the numerous sensitive operations and components involved in producing such tubes tend toward a higher percentage of reject or salvage ware.

In salvaging cathode ray tube envelopes, it is customary to re-convert an envelope into funnel and panel portions by opening it along the original sealing line. Direct fusion sealed envelopes are generally opened by sawing along the seal line, although fracture by mechanical or thermal shock may sometimes be utilized. Where funnel and panel members are sealed together with an intermediate soft sealing glass, it is sometimes feasible to reheat the seal and pull the funnel and panel apart. Where this is not feasible, as for example when the glass is hardened by devitrification, the more conventional sawing or fracture methods may be utilized.

Successful completion of the salvage operation depends on the separated envelope members being restored to a satisfactory condition for subsequent resealing. Where an intermediate sealing glass is employed it is highly desirable, if not absolutely essential, to completely remove all traces of the initial sealing glass in order to provide clean sealing surfaces for application of fresh sealing glass. This is particularly true where the sealing glass has been devitrified as described in co-pending application S. N. 562,763 referred to above. A major factor then in the success of an intermediate sealing glass method for production of cathode ray tube envelopes is the availability of an efficient method for removing the sealing glass in salvage operations.

Mechanical abrading methods such as grinding, sand blasting and wire brushing have been proposed and tested. While these methods are effective in removing the glass, small glass or abrasive particles impinge on the surface of glass tube components being cleaned and produce minute scratches and checks on such surfaces. These surface scratches and checks in turn tend to weaken the glass and are a source of frequent bulb fractures and implosions when the bulb components are subsequently resealed and evacuated. Although rather elaborate masking methods can be devised to avoid such impingement, these procedures are cumbersome and impractical.

As a result consideration has been given to chemical methods of glass removal. Such methods are limited in that they must be selective in nature, that is must remove the sealing glass without appreciably altering the base glass or other material of the tube component. For that reason such well known glass solvents as hydrofluoric acid and hot caustic solutions can not be used.

It is well known that some glasses, including the lead borate glasses under consideration, are subject to attack by acids such as $HNO_3$ and HCl, and even by moisture, and such glasses are often referred to as having poor chemical durability or resistance to chemical attack, or as weathering badly. However, such chemical attack on glass generally occurs over an extended period of time, whereas a method of glass removal suitable for commercial salvage practice would be required to remove an appreciable amount of glass in a matter of minutes rather than hours or days. Accordingly, it was not heretofore considered reasonable, or even possible, that such chemical attack on glass could form the basis for an effective salvage method.

I have now found, however, that under certain unexpected conditions the rate of attack and solution by nitric acid on lead borate type glasses is sufficiently rapid to provide an economical and effective method of removing such glasses from sealing surfaces. It is a primary purpose of the present invention to provide such a method.

Figure 2:
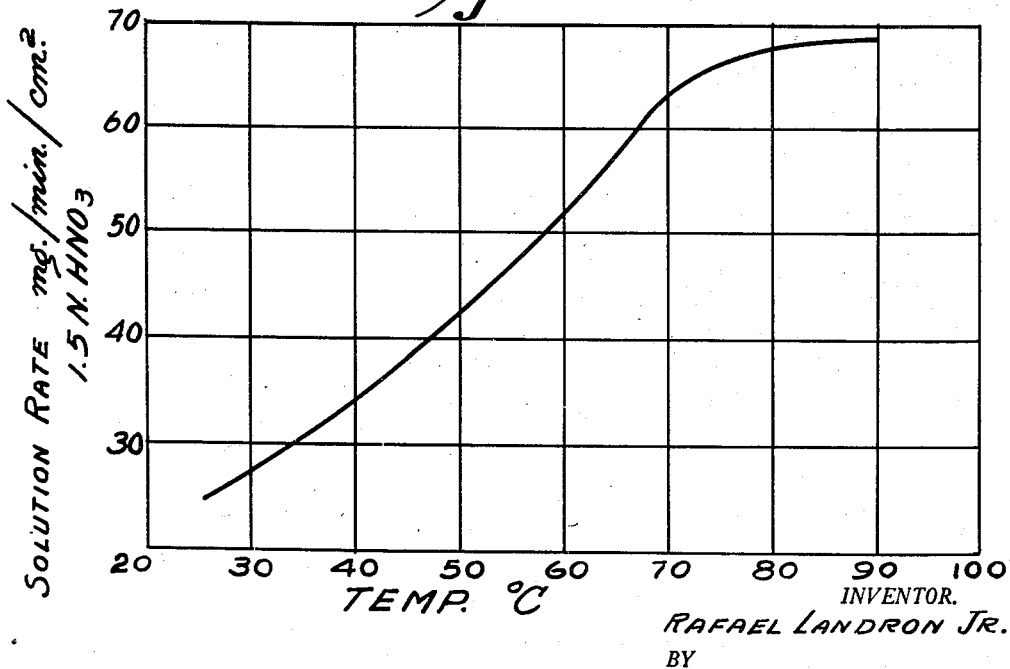

The invention is described in conjunction with the accompanying drawings in which:

Fig. 1 is a graphic representation of the rate at which a glass dissolves in nitric acid solutions, Fig. 2 is a graphic representation of the rate at which a glass dissolves in 1.5 N $HNO_3$ at varying temperatures and Figs. 3–7 provide a schematic representation of cathode ray tube salvage in accordance with the invention wherein Fig. 3 is an elevational view, partially in section, of a sealed cathode ray tube to be salvaged; Fig. 4 is a somewhat enlarged fragmentary view of the sealing area showing the tube opened up for salvage; Fig. 5 is an elevational view in section of the separated tube in an acid salvage bath; and Figs. 6 and 7 respectively are elevational views in section showing the panel and funnel components of the tube at conclusion of the salvage operation.

The present invention resides in a method of removing a lead borate sealing glass from a sealing surface which comprises immersing the glass coated sealing surface in a bath of nitric acid having a normality between 0.5 N and 2.5 N for a time sufficient for the acid to react with and dissolve the lead borate glass.

The term lead borate glass is here used in its conventional sense to mean a glass in which the principal glass-forming oxide is boric oxide, $B_2O_3$, and the principal modifying oxide is lead oxide, PbO. In addition to these two essential oxides other compatible glass-forming materials may be present in minor amounts, that is in amounts ranging up to about 15%. Such additional glass-forming materials include the alkali metal oxides, divalent metal oxides such as the alkaline earth metal oxides and ZnO, $Al_2O_3$ and $SiO_2$. By way of illustrating lead borate sealing glasses which may be removed by the present method, the following glass compositions are given in percent by weight:

Table I

|  | 1 | 2 | 3 | 4 | 5 | 6 |
|---|---|---|---|---|---|---|
| PbO | 77.5 | 78.5 | 77.5 | 80 | 80 | 80 |
| $B_2O_3$ | 9 | 8 | 8 | 10 | 11 | 11 |
| $Al_2O_3$ | 1 | 1 | 1 | 5 | 8 | 9 |
| $SiO_2$ | 2.5 | 2.5 | 3.5 | 5 | 1 | |
| ZnO | 10 | 10 | 10 | | | |

Examples 1–3 illustrate glasses which may be devitrified during or subsequent to formation of a seal. It has been found that these glasses in their devitrified state are generally more readily attacked and dissolved than conventional stable sealing glasses such as illustrated in Examples 4–6.

Prior to the present invention, it was generally thought that relatively concentrated solutions of $HNO_3$ would be most effective for borate glass removal and acid baths having a concentration of at least 3 N were recommended for and used in early unsuccessful experiments. Contrary to this prior belief, I have now found that the rate of solution of lead borate type glasses in nitric acid is greater by a factor of 3 or more in relatively dilute solutions, that is on the order of 1 N to 2 N, as compared to stronger solutions such as 3 N or greater.

This surprising discovery is illustrated in Fig. 1 where the rate of solution for a representative lead borate sealing glass is plotted against concentration of nitric acid. The graphic illustration of Fig. 1 is plotted from the data shown in Table II, below wherein the rate of glass solution is recorded in mg./min./sq. cm.:

Table II

| Acid Conc. | Solution Rate | Acid Conc. | Solution Rate |
|---|---|---|---|
| 0.25 N | 3.11 | 2.00 N | 16.20 |
| 0.50 N | 6.44 | 2.50 N | 7.34 |
| 0.75 N | 9.45 | 3.00 N | 5.68 |
| 1.00 N | 11.3 | 4.00 N | 3.64 |
| 1.25 N | 14.95 | 5.00 N | 2.52 |
| 1.50 N | 17.67 | 6.00 N | 1.47 |

The data set forth above were obtained by immersing substantially identical test bars of glass in nitric acid solutions for a given length of time with the solutions having the various normalities indicated and being maintained at a constant temperature of 21° C. The amount of glass dissolved within a 40-minute period of time was determined by differential weight and the rate of solution computed. The glass test bars or samples were all molded from a single batch of finely ground sealing glass having a composition corresponding to that of Example 1 in Table I above. The glass was thoroughly mixed and then molded into approximately the test shape desired. The molded glass shapes were fired in accordance with a standard cathode ray tube sealing schedule to simulate the devitrification induced in the glass in commercial use. The bars were then cut and ground to a uniform size so that the only appreciable variable was that of acid normality.

As indicated in Fig. 1, nitric acid concentrations below about 0.5 N and above 2.5 N are relatively ineffective. Since a maximum rate of solution occurs with about 1.7 N acid, it is generally desirable in commercial operations to maintain an acid bath within a range of 1.5–2.0 N.

In general, solution rates increase with the temperature of the solvent. Hot nitric acid, however, has been considered a source of poisonous fumes and hence a health hazard. I have now found that, while moderate heating of weak nitric acid baths suitable for present purposes produces a marked increase in solution rates, no measurable loss of acid occurs from such heating. The increase of solution rate with temperature is illustrated graphically in Fig. 2 of the drawing where rate of glass solution is plotted against temperature for a 1.5 N nitric acid bath using data set forth in Table III below:

Table III

| Temperature in ° C. | Solution Rate, mg./min./sq. cm. |
|---|---|
| 25 | 25.7 |
| 30 | 27.6 |
| 40 | 33.2 |
| 50 | 43.6 |
| 60 | 51.7 |
| 70 | 63.3 |
| 80 | 67.3 |
| 90 | 68.5 |

The glass test bars used in obtaining this data were similar to those used in connection with Table II above and were prepared in identical fashion. For the present purposes a test bar was immersed in a bath for 5 minutes at a given temperature and the loss in weight measured by difference. While heating of an acid bath is indicated as being generally beneficial, it is apparent that above 80° C. very little benefit accrues and I prefer to operate at 70–80° C.

I have further discovered that, while very little if any acid is lost over a period of time, water evaporates to a considerable extent from a nitric acid bath even at low temperatures. As a result the normality of a nitric acid bath tends to increase steadily on standing and, in the course of a day or two at room temperature, may increase by as much as one unit, that is from 2 N to 3 N or from 3 N to 4 N. This change is due solely to evaporation of water and, in the light of the data in Table I above, it is readily apparent that an otherwise effective bath may become sluggish and ineffective in a short time simply by evaporation. It is my belief that initial attempts to use nitric acid baths failed because the baths were either made up too strong, or rapidly became too strong due to this surprising preferential evaporation of water.

In carrying out the method of the present invention then, I prefer to start with a nitric acid bath which is about 2 N although concentrations up to 2.5 N may be used if desired. Periodically, preferably each day, water is added to maintain the bath at a constant level thus replenishing evaporation loss and maintaining the acid at a sufficiently low concentration. Samples from the bath are also titrated regularly, e. g. each week, to serve as a check on acid normality or strength. By following this practice and maintaining an acid bath within a normality range of about 0.5 N to 2.5 N with additions of water, I have extended the life of regularly used acid baths from a few days to as long as three months. I prefer, however, to add sufficient fresh acid to bring the normality back to about 2.0 N whenever the normality decreases to about 1.5 N. In this way operating time per bulb is maintained at a minimum.

Ultimately, a bath becomes saturated with the nitrates which form in the course of dissolving glass, and it becomes necessary to remove these salts or else neutralize and discard the bath. Lead nitrate, of course, is the principal salt present and I have found that, when a hot bath is cooled to room temperature or below, a major portion of this salt crystallizes or precipitates out. It may then be recovered by decanting or filtering in conventional manner. This serves the dual purpose of prolonging the life of a bath indefinitely with addition of fresh acid, and recovering an expensive raw material, lead nitrate, which may be used in glass melting or otherwise.

For a better understanding of the invention reference is made to Figs. 3–7 wherein the steps involved in salvaging a cathode ray tube in accordance with the invention are schematically illustrated. Fig. 3 shows a tube envelope, generally designated by the numeral 10, composed of a funnel section 12 and panel section 14. Integrally united with the opposed peripheral edges of funnel 12 and panel 14 respectively are metal bands 16 and 18 which are joined together with a thin interlayer 20 of soft, lead borate, sealing glass to produce the composite tube envelope 10.

In Fig. 4 tube 10 is shown separated into its component parts funnel 12 and panel 14. This separation may be accomplished by any convenient means such as the physical fracture or thermal methods referred to earlier. As indicated, separation is effected in the sealing glass interlayer 20 with a portion of the sealing glass remaining firmly attached to each of metal bands 16 and 18. It will be noted that the sealing area is considerably exaggerated in the drawing for illustrative purposes.

In Fig. 5 tube members 12 and 14 are shown supported in nitric acid bath 22 on horizontal bars 24 mounted in the walls of tank 26 which contains the acid bath. It will be appreciated that any other conventional means of suspending or supporting members 12 and 14 might be substituted. The only essential requirement is that the peripheral sealing edges, metal bands 16 and 18 in the present illustration, be immersed in the acid bath so that the layer of sealing glass 20 adhering to such edges is completely exposed to the acid. The strength of the acid bath is maintained within limits prescribed above and the tube parts are left in the bath until the sealing glass is completely removed. The time will, of course, depend on bath strength and temperature and amount of glass involved, but will ordinarily be from 10 to 30 minutes in the case of parts having the usual amounts of sealing glass adhering to their sealing surfaces. The panel and funnel are then rinsed and dried in conventional manner, not illustrated, to produce, as shown in Figs. 6 and 7, respectively, a salvaged panel 14 and funnel 12 for return to the sealing line.

In carrying out the method of the present invention in one particular case, here cited by way of example, a pre-molded glass funnel and panel were provided with thin bands of an acid-resistant metal on their opposed peripheral edges. The metal bands had substantially flat sealing surfaces which were joined together with a soft lead borate sealing glass having a composition corresponding to that of Example 1 in Table I to form an envelope for a 22-inch rectangular cathode ray tube. About 75 grams of sealing glass were used and subsequent to formation of a seal the glass was devitrified in accordance with methods described in co-pending application Serial No. 562,763 referred to previously.

The composite envelope was then mechanically separated into its funnel and panel components by initiating a line of fracture in the devitrified sealing glass between the metal bands. The metal sealing surfaces of the separated parts were immersed in a 2 N nitric acid bath at approximately 40° C. and within a period of 20 minutes the sealing glass was completely removed from the metal surfaces. The panel and funnel members were then removed from the bath, rinsed in clean water, and dried preparatory to being resealed.

By way of comparison it may be noted that when a similar cleaning operation was carried out in an acid bath having a normality between 3 N and 4 N and operated at room temperature, that is 20–30° C., complete removal of the sealing glass from the parts required on the order of 2 hours or more. Thus it will be seen that the present invention provides a means of chemically removing sealing glass from sealing surfaces which is both effective and economically feasible for use in the salvage of cathode ray tube parts.

While the invention has been illustrated and discussed principally as applied to the removal of soft, lead-borate, sealing glasses from the sealing surfaces of metal-banded television bulbs, it will be appreciated that it is equally applicable to the removal of such glasses from other types of surfaces, including acid-resistant glass and ceramic surfaces.

What is claimed is:

1. The method of removing a lead borate sealing glass from a sealing surface which comprises immersing the glass coated sealing surface in a bath of 0.5 N–2.5 N nitric acid for a time sufficient for the acid to react with and dissolve the lead borate glass.

2. The method of claim 1 in which the concentration of the acid bath is 1.5–2.0 N.

3. The method of removing a lead borate sealing glass from a sealing surface which comprises immersing the glass coated sealing surface in a heated bath of 0.5 N–2.5 N nitric acid to dissolve the lead borate glass.

4. The method of claim 3 in which the bath temperature is 70–80° C.

5. The method of removing lead borate sealing glass from sealing surfaces which comprises successively immersing the glass coated sealing surfaces in a bath of nitric acid to dissolve the lead borate glass and maintaining the acid bath between 0.5 N and 2.5 N.

6. In the salvaging of cathode ray tube components sealed together with a lead borate sealing glass, the method which comprises dissolving the sealing glass from the sealing surfaces in a 0.5 N–2.5 N nitric acid bath.

7. The method of claim 6 in which the components are mechanically separated prior to dissolution of the sealing glass.

8. In the salvaging of cathode ray tube components sealed together with a lead borate sealing glass, the method which comprises providing a 0.5 N–2.5 N nitric acid bath, adding water to the bath at intervals to maintain a substantially constant level, and immersing the glass coated sealing surfaces in the bath to dissolve the sealing glass.

9. The method of claim 8 in which the bath is maintained at 70–80° C.

10. The method of claim 8 in which the acid bath is maintained at a concentration of 1.5–2.0 N.

11. The method of claim 5 which includes the additional steps of precipitating lead nitrate and separating it from the liquid portion of the bath.

References Cited in the file of this patent

UNITED STATES PATENTS

| | | |
|---|---|---|
| 1,360,505 | Ueda | Jan. 10, 1919 |
| 2,235,568 | Waterman | Mar. 18, 1941 |
| 2,315,329 | Hood et al. | Mar. 30, 1943 |
| 2,348,704 | Adams | May 16, 1944 |
| 2,582,919 | Biefeld | Jan. 15, 1952 |